United States Statutory Invention Registration [19]

[11] Reg. Number: H231

Young [43] Published: Mar. 3, 1987

[54] ROCKET FUEL

[75] Inventor: Gerald P. Young, Newark, Del.

[73] Assignee: The United States of America as represented by the Secretary of the Army, Washington, D.C.

[21] Appl. No.: 900,911

[22] Filed: Aug. 26, 1986

[51] Int. Cl.[4] ..... C06B 29/10; C06B 29/04

[52] U.S. Cl. ..... 149/84; 149/85; 149/117

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

The composition of this invention is a colored-smoke pyrotechnic for use as a rocket fuel which can propel a 500 gram grenade assembly along a trajectory of about 100 meters while producing a trail of intensely colored, highly visible smoke. The composition contains ammonium sulfamate, potassium chlorate, sucrose, and an organic dye. The sulfamate ingredient functions as a primary reactant, and forms a large quantity of smoke and other gaseous by-products. The potassium chlorate and sucrose exists as a mixture, and when burning produces a large amount of energy which initiates the reaction sequence. The organic dye in the composition is volatilized by the heat, and subsequently condenses in the exhaust plume to color the smoke trail.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROCKET FUEL

GOVERNMENTAL INTEREST

The invention described herein may be manufactured, used and licensed by or for the Government for Governmental purposes without payment to me of any royalties thereon.

FIELD OF USE

This invention relates to an improved pyrotechnic composition containing ammonium sulfamate, said composition functioning as a rocket fuel.

BACKGROUND OF THE INVENTION

There are various devices and compositions which are presently used to propel projectiles to targets. The current grenade launcher system employs a specially adapted rifle, a special cartridge, and grenade launcher. The typical sequence for firing involves loading of the grenade into a launcher tube, attaching the tube to the rifle by a special adapter, loading the cartridge into the rifle, aiming the rifle at the target, and pulling the trigger of the rifle. The propulsion cartridge produces a large quantity of expanding gas which enters the launcher and forces the grenade out of the tube to the target. The grenade fuze is initiated as the grenade is launched or the fuze is initiated on impact. There are also other systems which employ the use of mortars or rockets to deliver the payload to other specified targets.

The disadvantages of all of the above systems are that field personnel are required to carry a large amount of auxiliary equipment. This reduces the mobility of the field personnel, increases fatigue of the individual soldiers, and requires specialized knowledge for the operation of the various devices. Another inherent disadvantage of the presently used system is the necessity for a separate propellant material which is either carried separately or incorporated into the mortar, rocket or shell. The latter rounds of ammunition require extensive training for their efficient and effective use.

SUMMARY OF INVENTION

It is therefore a general object of the present invention to provide a smoke composition which functions as a propellant for use in delivering grenades, rockets, and mortars to targets without the use of specialized equipment by the soldier in the field.

Another object of this invention is to provide a colored-smoke composition which functions as a propellant to deliver a grenade assembly of 500 grams over a range of about 100 meters to a target without specialized equipment.

A further object is to provide a colored-smoke pyrotechnic composition containing ammonium sulfamate which functions as a propellant.

The colored-smoke pyrotechnic composition of this invention contains the following ingrediants within the critical ranges indicated in the following table:

TABLE 1

| | Ranges in Parts by Weight |
|---|---|
| Ingredients of Composition | |
| Ammonium Sulfamate | 5–20 |
| Potassium Chlorate | 13–30 |
| Sucrose | 12–30 |
| Organic Dyes (1,4-diamino- | 30–50 |

TABLE 1-continued

| | Ranges in Parts by Weight |
|---|---|
| 2-methoxy-anthraquinone) | |
| Optionally | |
| Kaolin Clay | 5–25 |

The ranges of ingredients utilized in this composition are critical. If the ammonium sulfamate is present in this composition in an amount below 5 parts by weight, there will be no reaction to produce the desired propellant gases. However, if the presence of the cited sulfamate exceeds 20 parts by weight, the effect will be a deflagration or explosion of the device containing the composition. As for the potassium chlorate, an amount below 13 parts by weight will tend to cause a dud. In other words, there will be no reaction at all within the composition. However, an amount of potassium chlorate above 30 parts by weight in the composition will also create possible deflagration or explosion. Also, if the sucrose should be present in the composition in an amount below 12 parts by weight, the composition will create a large amount of slag and will burn too slowly. Increasing the sucrose above 30 parts by weight in the composition will also create slag and tend to an altered burning rate which will not be effective enough for propulsion. Also, if the organic dye is present in the composition below 30 parts by weight, the smoke will be very diluted, and the visibility of the smoke will be reduced. It has been found, however, that if the dye is present above 50 parts by weight, the smoke cloud will be effected by the decomposition of the dye.

PREFERRED EMBODIMENT

The composition having the following ingredients in the amounts shown have been found to produce a highly successful colored-smoke pyrotechnic for use in propelling a grenade assembly weighing 500 grams along a range of about 100 meters.

| Ingredient | Example<br>Parts by Weight |
|---|---|
| Ammonium Sulfamate | 7 |
| Potassium Chlorate | 22 |
| Sucrose | 15 |
| Organic Dye (1,4-diamino-2-methoxy-anthraquinone) | 42 |
| Kaolin Clay | 14 |

The above cited colored-smoke composition of this invention propels a 500 gram grenade assembly about 100 meters while producing a trail of intensely colored, highly visible smoke. The ammonium sulfamate is used in the composition as a primary reactant material which forms large quantities of gaseous byproducts. The sequence of reaction is initiated by the energy released from the mixture of potassium chlorate and sucrose. The organic dyes of the anthraquinone and azo families used in the composition are volatilized by the heat generated from the mixture of potassium chlorate and sucrose, and subsequently condense in the exhaust plume to form a colored smoke trail for the propelled munition.

In other words, the fuel and oxidizer reaction generates a large amount of heat. This is used to initiate a reaction wherein the ammonium sulfamate yields a large quantity of gas for propulsion. This heat also volatilizes the organic dye to produce an intense color to the gaseous mixture produced by the ammonium sulfamate. In the preferred embodiment, a small amount of kaolin clay is added as a filler and cooling agent.

The decomposition temperatures of mixtures of sugar and potassium chlorate have been determined by differential thermal analysis and are shown in the table below

TABLE

| Temperature of Exothermic Decomposition | |
|---|---|
| Composition | Temperature |
| Sucrose and Potassium Chlorate | 140 |
| Lactose and Potassium Chlorate | 190 |
| Potassium Chlorate | 370 |

As can be seen from the above table, sucrose decomposes at a lower temperature than lactose. Thus, sucrose would be preferable for the volatilization of ammonium sulfamate because the latter ingredient has a melting point of 125° C. and a boiling point of 160° C. with some decomposition.

The organic dyes utilized in the present composition include the following, viz.

| INDUSTRIAL NAME | CHEMICAL NAME |
|---|---|
| Solvent Red 1 | Ortho methoxy-phenyl-azo-beta-napthol. |
| Solvent Red 3 | Para ethoxy-phenyl-azo-napthol. |
| Solvent Red 24 | 1-hydroxy-2-azo-methyl-benzene-para-azo-methyl benzene napthalene. |
| Solvent Red 23 | 1-hydroxy-2-azo-benzene-para-azo-benzene-napthalene |
| Solvent Red 27 | dimethyl-phenyl-azo-dimethyl-phenyl-azo-beta-napthol |
| Solvent Green 3 | 1,4-paratoluidino anthraquinone |
| Solvent Yellow 33 | 2-(2-quinolyl)-1,3-indandione |
| Disperse Red 9 | 1-methyl amino anthraquinone |
| Disperse Red 11 | 1,4-diamino-2-methoxy-anthraquinone |
| Disperse Red 15 | 1-amino-4-hydroxy anthraquinone |
| Mordant Red | 1,2-dehydroxy-anthraquinone |

PROCESSING

The components of the composition were individually weighed, and passed through a 20 mesh screen. To be specific, 70 grams of ammonium sulfamate, 420 grams of dye, 150 grams of sucrose, 220 grams of potassium chlorate, and 140 grams of kaolin clay were individually weighed and screened. All of the above ingedients were placed in a mixing bowl of a planetary mixer, and 350 cc of acetone were added thereto. The above ingredients were mixed wet until the resulting mixture formed small spherical pellets of agglomerated material having a size between 0.25 to 0.80 cm in diameter. At the stage where granulation begins to occur, most of the acetone has already evaporated to the surrounding air leaving behind 3 to 5% acetone in the slightly damp granulated mixture. The latter granules were removed from the mixing bowl and were spread into long trays for oven drying at 60° C. for a minimum of 20 hours to drive off residual acetone. The resulting product was then ready for loading.

GENERAL LOADING

The above mixture was manually loaded into a cylindrical grenade body which had a diameter of about 2.25 inches. At this point, the mix was then hydraulically pressed in several increments into the grenade body with a dead load of 5000 pounds. A tapered core hole was formed in the pressed mixture by inserting a bronze mandrel through a hole which had been drilled in the bottom of the grenade body.

A liquid starter mixture was then poured into the top of the grenade, and allowed to flow down the core hole, coating all air exposed surfaces of the consolidated mixture. After allowing the acetone in the starter mix to evaporate, a conventional lid was applied to the grenade body and secured in place. A standard M201A1 igniting fuze was then screwed into the threads of the grenade lid.

The starter mixture utilized above was made from 43.2% potassium chlorate, 16.8% sulfur, 30% sodium bicarbonate and 10% cornstarch. This dry mixture was blended with a liquid binder mixture containing 96% acetone and 4% nitrocellulose. Sixty parts of the dry mix were blended with 40 parts of the cited binder solution.

At this point in processing, the grenade was ready for use.

USE

A shallow trough or trench was made in the ground, and the grenade was placed therein with the fuze facing the direction of the target area. Once the fuze pin was removed, the started mixture was initiated which, in turn ignited the composition of this invention. The grenade then travelled 100 meters toward the target in 18 to 21 seconds. The accuracy of the technique was surprising without the use of a launch tube or auxiliary equipment. A smoke plume of brightly colored hue trailed behind the grenade during its arcing trajectory.

In conclusion, only one mixture was required to propel the grenade, where in the art conventional combinations of separate propellant and payload are necessary. The propulsion of the grenade is dependent on the evolution of gases by the reaction of the fuel and oxidizer, and this drives the conversion of solid ammonium sulfanate into large quantities of oxide of nitrogen gas, nitrogen and ammonium sulfate. Kaolin provides long term storage stability, reproducible burn time, and prevents dye degradation during storage. The composition of this invention is the GPY-R59 which provides a good smoke plume and enough gas to propel a grenade 110 meters.

What is claimed:

1. An improved colored-smoke composition comprising:
   a. Ammonium sulfamate present between about 5 and 20 parts,
   b. Potassium chlorate present between about 13 and 20 parts,
   c. Sucrose present between about 12 and 30 parts,
   d. Organic dye present between about 30 and 50 parts, all said parts by weight based on the total weight of the composition.

2. The composition of claim 1 wherein kaolin clay is present between about 5 and 25 parts by weight.

3. An improved colored-smoke composition comprising
   a. Ammonium sulfamate present at about 7 parts,
   b. Potassium chlorate present at about 22 parts,
   c. Sucrose present at about 15 parts,
   d. Organic dye present at about 42 parts, and
   e. Kaolin clay present at about 14 parts, all said parts being parts by weight based on the total weight of the composition.

4. The composition of claim 3 wherein the organic dye is 1.4-diamino-2-methoxy-anthraquinone.

* * * * *